Figure 1:
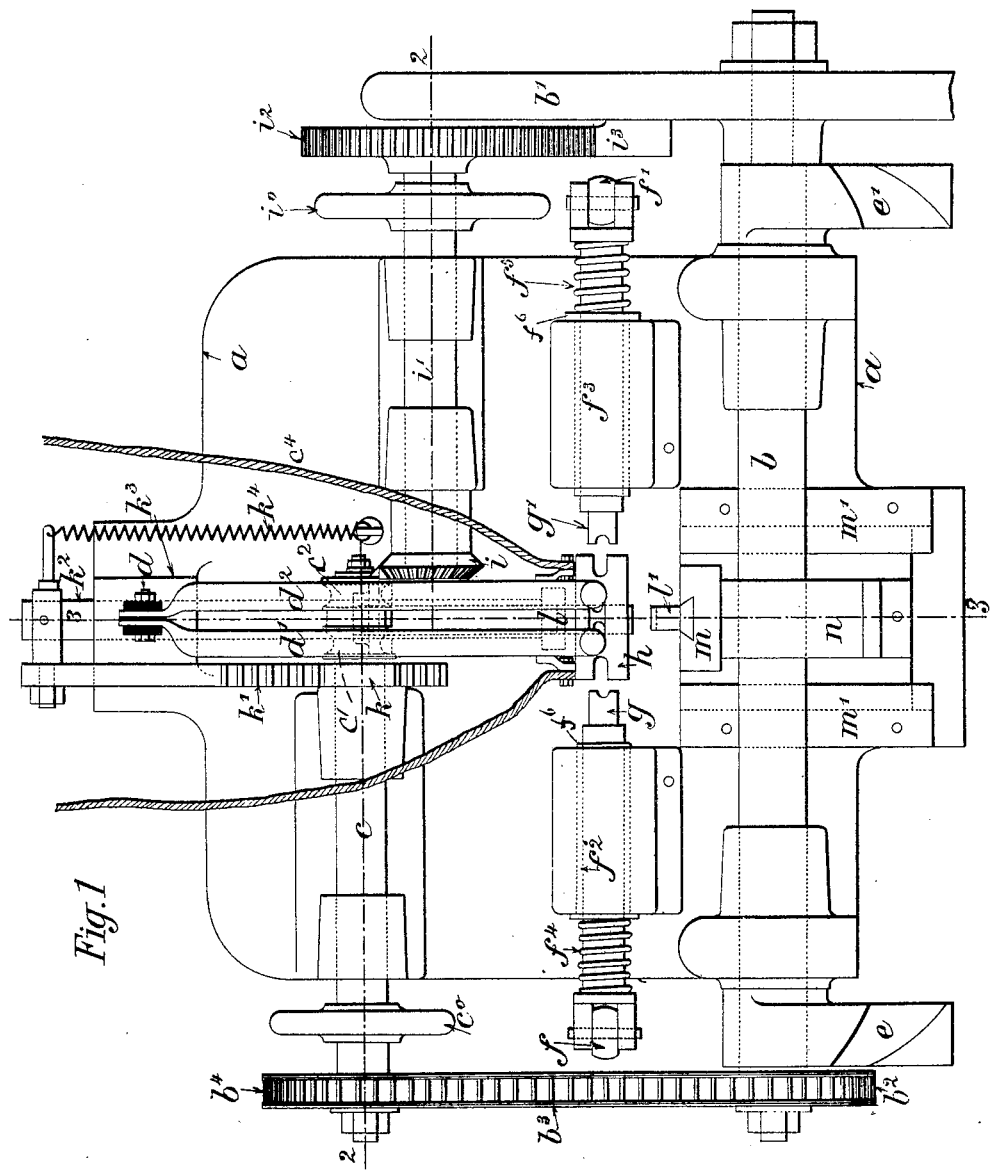

No. 672,268. Patented Apr. 16, 1901.
E. F. GIRAUD.
ELECTRIC CHAIN LINK WELDING MACHINE.
(Application filed Feb. 12, 1900.)

(No Model.) 3 Sheets—Sheet 1.

Witnesses:
C. Holloway
M. E. Pinckney

Inventor:
Eugène François Giraud,
By J. E. M. Bowen
Attorney

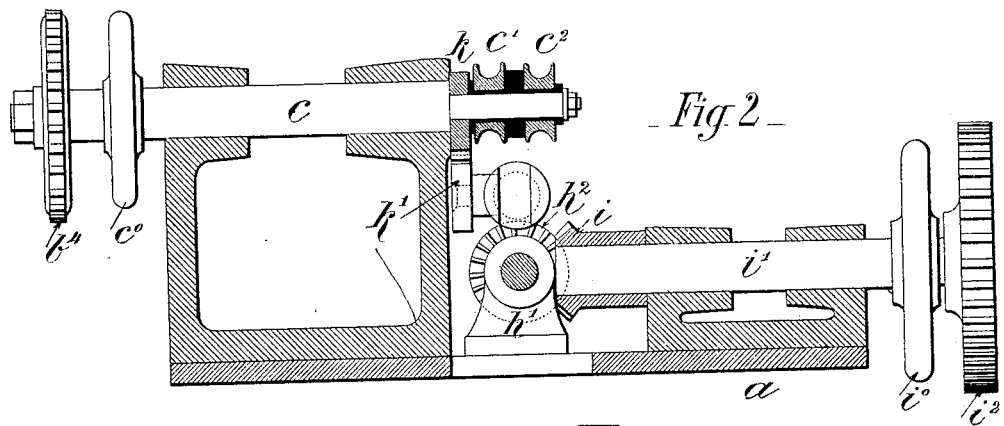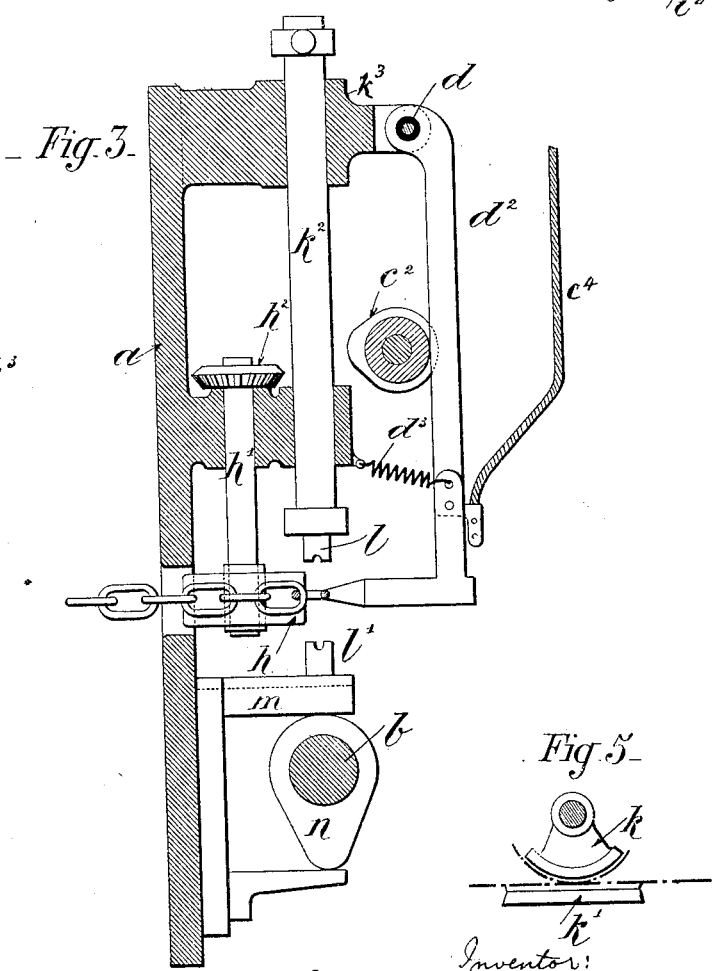

No. 672,268. Patented Apr. 16, 1901.
E. F. GIRAUD.
ELECTRIC CHAIN LINK WELDING MACHINE.
(Application filed Feb. 12, 1900.)
(No Model.) 3 Sheets—Sheet 3.
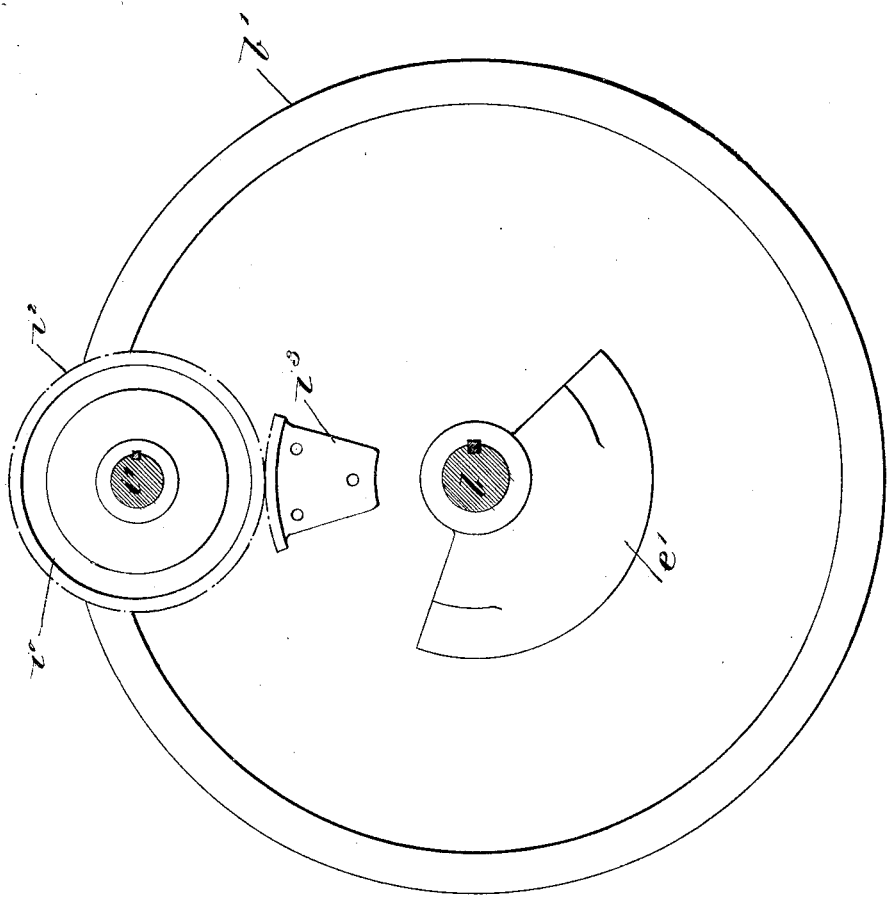
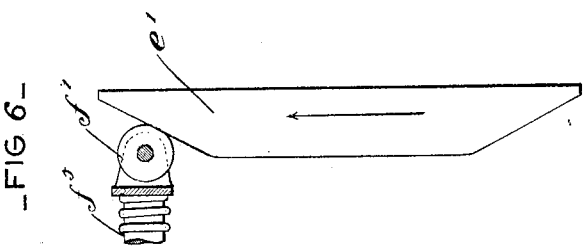
Witnesses:
W. C. Pinckney
C. Holloway
Inventor:
Eugene François Giraud
By J. E. W. Bowen,
Attorney.

UNITED STATES PATENT OFFICE.

EUGÈNE FRANÇOIS GIRAUD, OF DOULAINCOURT, FRANCE.

ELECTRIC CHAIN-LINK-WELDING MACHINE.

SPECIFICATION forming part of Letters Patent No. 672,268, dated April 16, 1901.

Application filed February 12, 1900. Serial No. 4,870. (No model.)

*To all whom it may concern:*

Be it known that I, EUGÈNE FRANÇOIS GIRAUD, mechanical engineer, a citizen of the Republic of France, residing at Doulaincourt, Haute-Marne, France, have invented certain new and useful Improvements in or Relating to Electric Chain-Link-Welding Machines, of which the following is a specification.

The present invention relates to a machine for welding chain-links by means of electricity and for molding or finishing the links when welded. The chain of which the links are to be welded is arranged on a supporting cylinder or drum which turns, when the fly-wheel of the machine is actuated by hand or by power, in such a manner that after one link has been welded another is presented in position ready to be welded.

In the accompanying drawings is represented, by way of example, a welding-machine according to this invention.

Figure 1 represents an elevation of the machine; Fig. 2, a horizontal section on the line 2 2 of Fig. 1; Fig. 3, a vertical section on the line 3 3 of Fig. 1, while Figs. 4 and 5 are detail views. Fig. 6 is an enlarged edge view of a cam, showing also the roller bearing thereon. Fig. 7 is a vertical transverse section just at the right of frame $a$, roller $f'$ being omitted.

All the parts of the machine are arranged on a frame $a$, which carries in suitable bearings the main operating-shaft $b$, at one end of which is keyed the actuating fly-wheel $b'$, while at the other end is keyed a toothed wheel $b^2$, geared by means of an endless chain $b^3$ with a similar wheel $b^4$, keyed on one end of a shaft $c$, the other end of which is provided with two cams $c'$ $c^2$, placed adjacent to two levers $d'$ $d^2$, arranged at a suitable distance from each other and pivoted on the same pin $d$ and provided at their lower ends with electrodes. Each of these levers is acted upon by a suitably-arranged spring $d^3$, which keeps the lever in constant contact with its cam $c'$ or $c^2$. These levers are also connected by means of suitable conductors $c^4$ with the respective poles of a dynamo or any other suitable source of electricity, and they are suitably insulated from each other and from the metal frame of the machine, so as to prevent the current passing directly from one to the other. Toward the ends of the shaft $b$ are symmetrically keyed two similar cams $e$ and $e'$, provided with inclined planes and intended to actuate, respectively, rollers $f$ and $f'$, arranged at the ends of two rods $f^2$ $f^3$, which are guided, being suitably insulated by a bushing or lining $f^6$, in sleeves connected to the frame $a$. On these rods are arranged springs $f^4$ and $f^5$ in such a manner as to press the rods outwardly, as away from each other, the inner ends being provided with dies $g$ $g'$, adapted to surround the rounded side of the link.

In a horizontal plane passing through the axis of the rods $f^2$ and $f^3$ is arranged a cylindrical carrier $h$, mounted on a vertical shaft $h'$, being provided at its upper end with a beveled pinion $h^2$, gearing with a similar wheel $i$, mounted at the end of a shaft $i'$, on which is keyed a toothed wheel $i^2$, with which engages during a predetermined fraction of a complete revolution of the fly-wheel $b'$ a toothed section $i^3$, carried by the latter.

Close to the cam $c'$ and keyed on the shaft $c$ is a toothed section $k$, which gears with a rack $k'$, connected to a rod $k^2$, adapted to slide without turning in a guide $k^3$ on the frame $a$. This sliding device is influenced by a suitably-arranged spring $k^4$, and the rod $k^2$ is provided at its lower end with a matrix or die $l$, with a semicylindrical recess, so as to effectively embrace the wire of which the links of the chain to be welded are made. Immediately below this matrix $l$ is arranged another similar matrix $l'$, forming its counterpart and arranged on a slide $m$, which can be moved between two guides $m'$ when suitably actuated by a cam $n$, arranged for that purpose on the operating-shaft $b$.

Adjusting hand-wheels $c^0$ and $i^0$ are mounted, respectively, on the shafts $c$ and $i'$ for the purpose of adjusting the machine by hand.

The machine works as follows: The chain to be welded is passed over the carrier $h$ in such a manner that a link is presented horizontally before the welding-iron, the open ends of the link facing the said irons. By turning by hand the wheel $c^0$ the movement is transmitted to the shaft $c$ and cams $c'$ and $c^2$, which first allow the levers $d'$ and $d^2$ to move in under the influence of the springs $d^3$.

Thus the electrodes come in contact with the link, which is placed horizontally before them. The current passes through one of the electrodes through the part of the link contained between these electrodes and which contains the opening of the link. At the same time the cams $e\,e'$ act on the rollers $f$ and $f'$, which push the rods $f^2$ and $f^3$ inward along their guides, and the dies $g$ and $g'$ embrace the ends of the link and press them together in such a manner as to bring the free ends of the wire forming the link together. This part becomes red-hot, owing to the action of the electric current, and owing to the pressure exercised on them the ends of the link become welded. When the welding is accomplished, the cams $c'$ and $c^2$ push back the electrodes, while the cams $e\,e'$ leave the rollers $f\,f'$, thereby causing the dies $g$ and $g'$ to recede from each other under the influence of their springs $f^4$ and $f^5$. Then the toothed sector $k$ becomes engaged with the rack $k'$, and having carried along the rack, and consequently rod $k^2$, releases the latter elements, which being actuated energetically by the traction-spring $k^4$ strike, by means of the matrix $l$, against the ridge upon the flat link which is being welded, said ridge being due to the squeezing together of the ends at the time of the welding. During this operation the flat link rests on the other side against the matrix $l'$, which for that purpose has been carried along by cam $n$. The operation for welding one link thus terminates. In order to weld another link, it is necessary to again turn the wheel $b'$. The matrices $l$ and $l'$ will then recede, and at a certain moment the toothed sector $i^3$ becomes engaged with the wheel $i^2$, which it turns, together with the shaft $i'$, the pinions $i$ and $h^2$, the shaft $h'$, and the carrier-cylinder $h$. The number of teeth in the sector $i^3$ is so calculated that the carrier-cylinder $h$ turns through an angle corresponding to two links of the chain, because the links present themselves alternately in horizontal and vertical positions, and in the latter position they cannot be welded by the machine. In order to weld the links which could not be welded owing to their vertical position, it is necessary to pass the chain a second time through the machine, arranging the same in such a manner that the links which formerly were vertically placed are now placed horizontally.

When the machine is set to work, the position of the toothed sector $k$ may be regulated as regards the rack $k'$ by turning by hand the wheel $c^0$, and in a similar manner the position of the carrier-cylinder $h$, and with it the chain itself, may be adjusted by turning by hand the wheel $i^0$.

What I claim is—

1. In an electric chain-link-welding machine the combination of a carrier-cylinder $h$ over which the chain to be welded is passed, electrodes movable to and from the link in position to be welded, the cylinder holding the chain so that the electrodes will when advanced rest on opposite sides of the joint to be welded, means for thus moving said electrodes, said electrodes being insulated from each other and adapted to be connected to the opposite sides of a circuit, matrices $l$, $l'$ movable against the welded link from opposite sides for removing the bur caused by welding, and means for operating the matrices.

2. In a machine for welding chain-links the combination of a carrier-cylinder $h$ over which the chain to be welded is passed with alternate links in horizontal and vertical planes respectively, and the unwelded ends of the horizontal links being in the side thereof farthest from the carrier $h$, electrodes insulated from each other and movable to and from the unwelded ends of the horizontal links when such links are brought to welding position, levers supporting the electrodes, cams $c'$, $c^2$ controlling said levers and the electrodes, means for driving said cams, dies $g$, $g'$ grooved to engage the ends of the heated link when moved forward, thereby pressing the heated ends of the link together.

3. In a machine for welding chain-links the combination of a carrier-cylinder $h$ over which the chain to be welded is passed with alternate links in horizontal and vertical planes respectively, and the unwelded ends of the horizontal links being in the side thereof farthest from the carrier $h$, electrodes insulated from each other and movable to and from the unwelded ends of the horizontal links when such links are brought to welding position, levers supporting the electrodes, cams $c'$, $c^2$ controlling said levers and the electrodes, means for driving said cams, dies $g$, $g'$ grooved to engage the ends of the heated link when moved forward, thereby pressing the heated ends of the link together, matrices $l$, $l'$, and means for moving them toward and from the welded joint of the link, the first movement reducing the bur caused by welding.

4. In a machine for welding chain-links the combination of a carrier-cylinder $h$ over which the chain to be welded is passed with alternate links in horizontal and vertical planes respectively, and the unwelded ends of the horizontal links being in the side thereof farthest from the carrier $h$, electrodes insulated from each other and movable to and from the unwelded ends of the horizontal links when such links are brought to welding position, levers supporting the electrodes, cams $c'$, $c^2$ controlling said levers and the electrodes, means for driving said cams, dies $g$, $g'$ grooved to engage the ends of the heated link when moved forward, thereby pressing the heated ends of the link together, matrices $l$, $l'$, and means for moving them toward and from the welded joint of the link, the first movement reducing the bur caused by welding, and means for turning the carrier $h$ a distance corresponding to the length of two links of the chain, whereby the next horizontal link is brought to welding position.

5. The combination in a chain-welding machine of shaft $b$, a driving-wheel therefor, gear-sector $i^3$, gear $i^2$, shaft $i'$ and gear $i$ driven thereby, shaft $h'$, gear $h^2$ thereon engaging gear-wheel $i$, chain-carrier $h$ on shaft $h'$, electrodes adjacent to the link of the chain in welding position, levers $d'$, $d^2$ pivoted, and insulated from each other, cams $c'$, $c^2$ and springs $d^3$ for operating the electrodes.

6. The combination in a chain-welding machine of shaft $b$, a driving-wheel therefor, gear-sector $i^3$, gear $i^2$, shaft $i'$ and gear $i$ driven thereby, shaft $h'$, gear $h^2$ thereon engaging gear-wheel $i$, chain-carrier $h$ on shaft $h'$, electrodes adjacent to the link of the chain in welding position, levers $d'$, $d^2$ pivoted, and insulated from each other, cams $c'$, $c^2$ and springs $d^3$ for operating the electrodes, dies $g$, $g'$, carrier-rods therefor, guides $f^2$, springs $f^4$, $f^5$, cams $e$, $e'$ on shaft $b$ formed to press dies $g$, $g'$ forward against the ends of the heated link.

7. The combination, in a chain-welding machine, of the chain-carrier, electrodes, die $l$, rod $k^2$, rack $k'$, gear-sector $k$, for advancing die $l$, means for retracting the die, die $l'$, guides therefor, and a cam for operating die $l'$.

8. The combination of a frame, a shaft $b$, wheel $b'$, shaft $c$, means for driving shaft $c$ from shaft $b$, cams $c'$, $c^2$, at the inner end of shaft $c$, levers $d'$, $d^2$ insulated from each other and from the frame and adapted to be connected to opposite sides of an electric circuit or a generator, a pivot for said levers, electrodes at the ends of the levers opposite their pivots.

Signed at Paris, France, this 26th day of January, 1900.

EUGÈNE FRANÇOIS GIRAUD.

Witnesses:
EDWARD P. MACLEAN,
GEORGE E. LIGHT.